United States Patent [19]
Northcott

[11] Patent Number: 6,098,195
[45] Date of Patent: Aug. 1, 2000

[54] MULTIPLE RECENT EVENT AGE TRACKING METHOD AND APPARATUS

[75] Inventor: Philip Lyon Northcott, Burnaby, Canada

[73] Assignee: PMC-Sierra Ltd., Burnaby, Canada

[21] Appl. No.: 09/054,442

[22] Filed: Apr. 3, 1998

[51] Int. Cl.$^7$ ............................................. H03M 13/00
[52] U.S. Cl. ........................ 714/812; 714/799; 714/815; 713/502
[58] Field of Search .................... 714/799, 811, 714/812, 819, 815; 713/502

[56] References Cited

U.S. PATENT DOCUMENTS 5,343,482  8/1994  Penner et al. ............................ 714/812
5,993,057  11/1999  Gulick et al. ............................ 371/812

Primary Examiner—Phung M. Chung
Attorney, Agent, or Firm—Pascal & Associates

[57] ABSTRACT

A method of detecting an alarm indication signal in a bitstream when the detection criterion is that a specified event occurs less than a predetermined number of times in a sliding window of a specified number of time periods comprising: tracking the age of the most recent predetermined number of the specified events, comparing the age to the specified number of time periods, and generating an alarm if the age of any specified event is greater than or equal to the specified number of time periods.

20 Claims, 1 Drawing Sheet

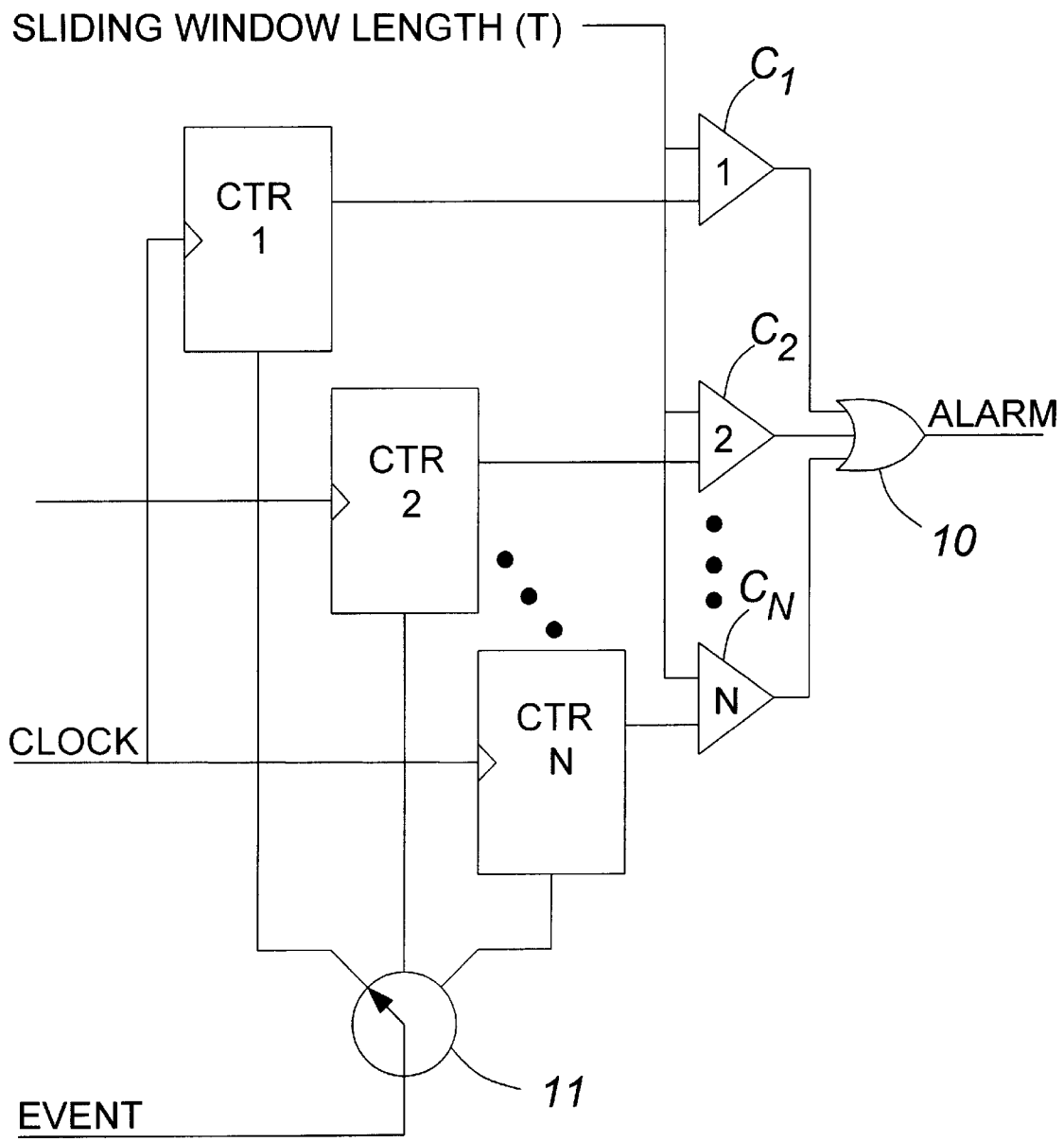

MULTIPLE RECENT EVENT AGE TRACKING METHOD AND APPARATUS

FIELD OF THE INVENTION

The general field of the present invention is telecommunications microelectronics. More specifically, the invention relates to a multiple recent event age tracking method and apparatus, particularly useful for implementing sliding-window event density specifications such as alarm indication signal detection specifications.

BACKGROUND OF THE INVENTION

Many specifications in telecommunications read "condition A is declared when event Y occurs less than N times in T time periods". Dependent on the particular specification, a sliding window approach may be required.

For instance, ITU-T specification G.775, section 5.5 requires that an alarm indication signal (AIS) defect at 6312 kbit/s be detected when the incoming signal has two or less zeros in a sequence of 3156 bits. In this case, Condition A is "Alarm Indication Signal Detected", event Y is "A zero received in the bit stream", N is 3, and T is 3156 bit periods. This requirement is referred to as J2 Physical AIS throughout the application.

Other similar specifications in G.775 include Section 5.6, which requires that an AIS defect at 32,064 kbit/s be detected when the incoming signal has two or less zeros in a sequence of 1920 bits, and section 5.7 which requires that an AIS defect at 97,728 kbit/s be detected when the incoming signal has two or less zeros in a sequence of 1,152 bits.

Similarly, ATM Forum 6312 Kbps UNI Specification Version 1.0 (af-phy-0029.000) requires that a payload AIS be detected when the incoming frame payload (time slots 1 . . . 96 of the frame) contain 2 or less ZEROS in a sequence of 3072 bits.

The standard way of fully implementing such a specification is to implement a T-bit shift register with an up/down counter. The up/down counter increments each time an event enters the shift register, and decrements each time an event drops out. Thus, the counter holds the count of events currently in the shift register. Whenever the count is less than the given threshold, condition A is declared. This implementation requires a T-bit shift register and a $\log_2 T$ bit counter. When T is large (such as 3156 bits for the J2 Physical AIS standard) this method requires a large circuit area, even if a RAM is used to implement the shift register. Many variations on this counter/shift register strategy have been implemented; one such application is disclosed in U.S. Pat. No. 5,343,482, Aug. 30, 1994, entitled "Method and Apparatus for Detecting Pulse Density Violations in T1 Transmission", issued to Penner et al, and commonly owned herewith.

A popular choice for an inexpensive partial implementation of the specification, especially where the specification is vague, is the fixed-window approach. In this approach, a $\log_2 T$-bit counter counts the number of times event Y occurs. At the end of each T time periods, the counter is compared against the threshold, and reset. Whenever the counter is less than the threshold N at the end of the T time period window, condition A is declared. This is an inexpensive solution, but does not detect all cases where a window T bits long contains less than N events.

The multiple event age tracking method described in this application is an extension of the known practice of using a counter to measure the age of an event. This single-event age tracking is used when a designer wishes to declare a condition B when more than T bit periods elapse between occurrences of an event Y. To implement the method, a counter is set up to increment in each time period in which a cycle does not occur, and to reset itself when the event does occur. If the counter exceeds T, then at least T bit periods have elapsed between occurrences of event Y, and condition B is declared.

STATEMENT OF THE INVENTION

In accordance with this invention, the multiple recent event age tracking method uses multiple counters with a rotating pointer in order to fully implement a sliding-window event density specification of the form "condition A is declared when event Y occurs less than N times in T time periods", when T is large and N is small, with a dramatic reduction in the amount of circuitry required. The method can also be used to look for event Y occurring more than N times in T time periods, where T is large but T-N is small.

In accordance with an aspect of the invention, a method of fully implementing a sliding-window event density specification is provided, comprised as follows: given that the specification may be rewritten in the form "condition A is declared when event Y occurs less than N times in T time periods", continuously tracking the age in time periods of the most recent N events Y in a bit stream, and declaring condition A if at least one of the N most-recent events has an age which is greater than or equal to T.

In accordance with another aspect of the invention, an apparatus is provided for the implementation of such a specification, comprising N saturating counters, N comparators, a clock input to each of the counters, and a rotating pointer connected to the reset of each of the counters. On occurrence of an event the pointer resets the counter to which it points and immediately points to the next counter. The output of each of the counters is connected to the input of a comparator. The other input of each comparator is connected to a source of a signal indicating the length T of a sliding window. Each comparator sources a logic 1 when its counter input is greater than or equal to its T input. The outputs of said N comparators are input to an OR gate, the output of which goes to logic 1 to indicate said condition.

In accordance with another aspect of the invention, the apparatus for detecting said condition may be implemented in software. A generic (pseudocode) description is provided of subroutines to track the age of the N most recent events Y, and to generate an indication if at least one event is older than the threshold value T.

BRIEF DESCRIPTION OF THE DRAWINGS

A better understanding of the invention will be obtained by a consideration of the detailed description below of a preferred embodiment, with reference to the following drawing which is a block diagram of apparatus for implementing a sliding-window event density specification such as the detection of an alarm indication signal.

DETAILED DESCRIPTION OF THE INVENTION

In order to determine whether or not at least N events have occurred in the past time period T, it is sufficient to track the age of the most recent N events. If the Nth most-recent event occurred more than T time periods ago, then there cannot have been more than N events in the last T time periods. So long as N is small, it is much less costly to track the age of N events than it is to maintain a precise count of the number of events in the previous T time periods.

One implementation of the invention, using saturating counters and a rotating pointer, is shown in the drawing.

The circuit shown consists of a series of N saturating counters CTR1, CTR2 . . . CTRN, a series of N comparators C1, C2 . . . CN, an OR gate 10 and a rotating pointer 11. Inputs to these circuits consist of a clock connected to the clock input of each counter, an event input connected to the rotating pointer 11, and a sliding window length input connected to one terminal of each of the N comparators C1, C2 . . . CN.

On reset, all counters are reset to zero, and the pointer is set to point to the first counter. On each clock transition, each counter increments, saturating at a value equal to or greater than T. Whenever an event (e.g. a zero in a string of ones) occurs, the counter to which the pointer is pointing is reset, and the pointer immediately increments to the next counter. This continues, with the pointer rotating through the counters in a circular fashion.

If at least one of the counters exceeds the threshold T (equal to the length of the sliding window) then we know that there have been less than N events in the past T time periods, and the Alarm condition is declared. The comparators (C1 . . . CN) perform this function, comparing the counts in each counter with the value of T. If the count equals or exceeds T, the comparator sources a logic 1 and the OR gate 10 asserts the alarm signal. The alarm remains asserted until all counters are once again less than T.

Thus in the example specified, J2 Physical AIS, the event being counted is the appearance of zeroes in the bit stream, three counters are used, and the threshold T is 3156 bits. Whenever one of the counters increments to 3156, the comparator associated with the counter will output a logic 1 and the OR gate 10 will generate an alarm.

In terms of implementation cost, the implementation described requires N $\log_2 T$ bit counters, a $\log_2 N$ bit counter for the pointer, plus N comparators. The comparators may be quite inexpensive so long as T is a constant (as it will be in most specifications). In the case where T is variable, a multiplexer could be used to direct the oldest event counter (which is always the one pointed to by the pointer) to the comparator. For the example of J2 Physical AIS, in which a threshold of 3 zeroes in 3156 bits is to be detected, 3 12-bit counters and a 2-bit pointer counter are used. This compares very favorably with the 3156-bit shift register that would be required using conventional means, even if a RAM were used to implement the shift register.

Although the present invention has been described in relation to the use of physical counters, the method of the invention works equally well when implemented in software. The following is a pseudocode description to enable a programmer easily to implement the method in software.

Assumptions:
The subroutine will be invoked once every "Time Period", where a time period is defined as an opportunity for an event Y to occur, or not occur. For instance, the subroutine might be called each time a bit arrives on a serial interface, if the event were the arrival of a 0.

Inputs:
EVENT is an input indicating that a new event, as defined in the specification, has occurred. THRESH is a constant or variable which indicates the length of the sliding window in the specification. N is a constant indicating the number of events to track. RESET is an input indicating to the subroutine that it is to set itself to its startup condition.

Outputs:
ALARM indicates that the condition described in the specification has been detected.

Variables:
COUNTER (1 . . . N) is an array of positive integers, representing the ages of the N most recent occurrences of EVENT. Thus COUNTER (3) would be the third positive integer in the array. POINTER is a positive integer used to index into the array COUNTER. C is a positive integer used as a temporary variable to index into array COUNTER inside looping instructions.

Pseudocode:
On Startup, do:
    Set COUNTER to an array of all-zero.
    Set POINTER to 1
on each subsequent call:
    If RESET is asserted,
        Set COUNTER to an array of all-zero.
        Set POINTER to 1.
        Deassert ALARM.
    Else if EVENT is asserted
        For C=1 . . . N,
            Increment COUNTER(C) by 1, saturating at THRESH
        Set COUNTER(POINTER) to 0
        If POINTER<N, increment POINTER by 1
        Else set POINTER to 1
        If COUNTER(POINTER)=THRESH, Assert ALARM
        Else Deassert ALARM.
    Else
        For C=1 . . . N,
            Increment COUNTER(C) by 1, saturating at THRESH
        If COUNTER(POINTER)=THRESH, Assert ALARM
        Else Deassert ALARM.

There is no reason why window length T needs to be a constant. Both N and T may be variable, so long as a sufficient number of sufficiently large counters are available. Varying the window length T is simple, and involves using actual comparators with an input T, as opposed to the simpler logic required to compare against a constant. In this case it may be profitable to use a multiplexer to always compare the age of the oldest event (which is the one the pointer is pointing to) using a single comparator, rather than use several comparators simultaneously.

There is also no reason why only a single condition must be monitored for. Given $N_{max}$ counters, with the pointer pointing to counter $N_p$ then counter $(N_p+1)$ mod $N_{max}$ contains the age of the second oldest event, counter 0 contains the age of the $N_p$th most recent event, counter $(N_p-1)$ mod $N_{max}$ contains the age of the most recent event, and so on. If it was necessary to implement a specification detecting if there had been at least 2 events in the past 1000, and 4 events in the past 2000, and 8 events in the past 4000, then eight 12-bit counters could be used. If the pointer points to counter $N_p$ then the condition is true if counter $N_p$>4000 or if counter $(N_p+4)$ mod $N_{max}$>2000, or counter $(N_p+6)$ mod $N_{max}$>1000. Thus a single set of counters may be used to monitor conditions involving several values of N and T. Similarly, N may be a variable, where the counter to be monitored for being greater than T is equal to (P-N)mod $N_{max}$ where P is the value of the pointer.

There are dozens of slight logical variants, such as looking for densities of more than a certain threshold, or densities of events failing to occur, or densities of certain classes of events, which are equally addressable by the present invention.

While the term "time periods" has been used throughout this disclosure, there is no reason why the window must consist of a number of equal time periods. "Time periods" really refers to an opportunity for a certain event to occur, or not to occur. Thus the method may have general applications to sparse event handling or tagging.

A person understanding this invention may now conceive of alternative structures and embodiments or variations of the above. All of those which fall within the scope of the claims appended hereto are considered to be part of the present invention.

I claim:

1. A method of detecting an alarm indication signal in a bitstream when the detection criterion is that a specified event occurs less than a predetermined number of times in a sliding window of a specified number of time periods comprising: tracking the age of the most recent predetermined number of said specified events, comparing said age to said specified number of time periods, and generating an alarm if the age of any specified event is greater than or equal to said specified number of time periods.

2. The method of claim 1 in which N is variable.

3. The method of claim 1 in which the time period is variable.

4. A method of detecting an alarm indication signal in a bitstream when the detection criterion is that a specified event occurs more than a predetermined number of times in a sliding window of a specified number of time periods, comprising: tracking the age of the most recent predetermined number of occurrences of said specified events not occurring, comparing said age to the specified number of time periods, and generating an alarm if the age is greater than or equal to said specified number of time periods.

5. A method of detecting an alarm indication signal in which the detection criterion is that an event Y occurs less than N times in a sliding window of T time periods, said method comprising tracking the age of the most recent N events, and if the Nth most recent event occurred T or more time periods ago, generating an alarm signal.

6. A method as defined in claim 5 in which Y is a zero bit, N is 3, and T is 3156 bits from a bit stream.

7. A method as defined in claim 5 in which Y is a zero bit, N is 3, and T is 3072 bits from the payload portion of a bit stream.

8. A method of detecting a sliding-window event density condition in which condition A is declared when event Y occurs less than N times in T time periods, comprising: tracking the age of the most recent N events Y and comparing the age of each event to the sliding window length T, and declaring condition A to be present if any of the most recent N events is T or more time periods old.

9. The method of claim 8 in which T is variable.

10. The method of claim 9 in which N is variable.

11. The method of claim 8 in which N is variable.

12. The method of detecting a sliding-window event density condition in which condition A is declared when event Y occurs more than (T-N) times in T time periods, where N is a predetermined number, comprising: tracking the age of the most recent N occurrences of event Y not occurring in a single time period, and comparing said age to said specified number of time periods T, and declaring condition A to be present if said age is greater than or equal to T time periods.

13. The method of claim 12 in which T is variable.

14. The method of claim 8 or 12 in which the time period is variable.

15. Apparatus for detecting a condition in a bit stream in which an event Y occurs less than N times in T time periods comprising N saturating counters, N comparators, a clock input to each of said counters, a rotating pointer connected to the reset of each of said counters, said pointer on occurrence of an event resetting the counter to which it is connected and immediately pointing to the next counter, the output of each of said counters being connected to the input of a comparator, a second input of each comparator being connected to a source of a signal indicating the length T of a sliding window, each comparator sourcing a logic 1 when its counter input is greater than or equal to its T input, the outputs of said N comparators being input to an OR gate, the output of which indicates said condition.

16. Apparatus as defined in claim 15, wherein there are N $\log_2$T-bit counters, said pointer comprising a $\log_2$N-bit counter.

17. Apparatus as defined in claim 15, wherein Y is a zero bit, N is 3 and T is 3156.

18. Apparatus as in claim 15 in which condition A is that Physical Layer Alarm Indication Signal is present, Y is a zero bit, N is 3, and T is 3156 bits from the bit stream.

19. Apparatus as in claim 15 in which condition A is that Payload Alarm Indication Signal is present, Y is a zero bit, N is 3, and T is 3072 bits from the Payload portion bit stream.

20. Apparatus as in claim 15, wherein the counters, comparators, pointer and OR gate components are implemented in software.

* * * * *